May 31, 1955     A. L. APPEL     2,709,543
SOAP DISPENSER
Filed Nov. 3, 1954     2 Sheets-Sheet 1
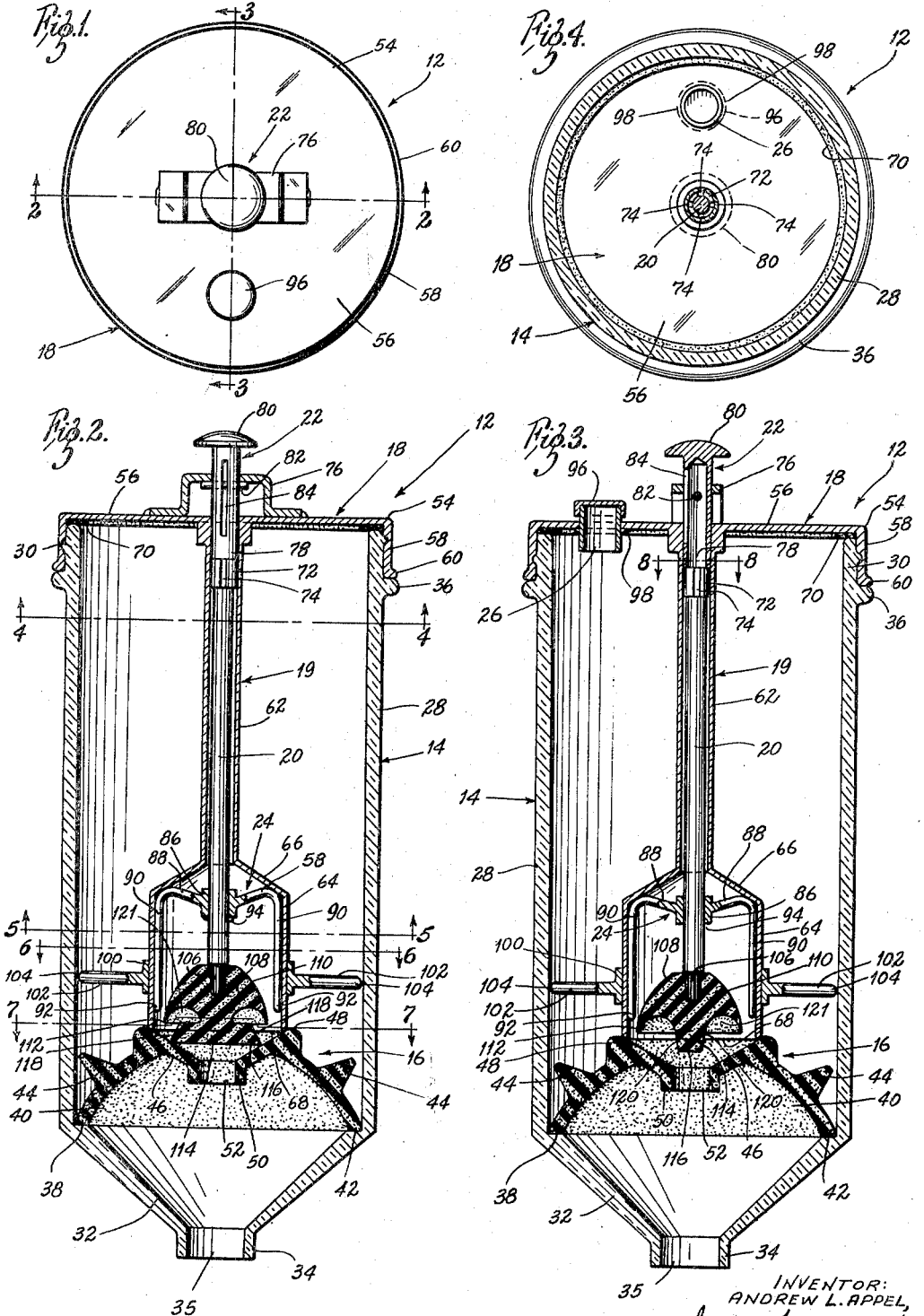
INVENTOR:
ANDREW L. APPEL,
BY George J. Mager
HIS ATTORNEY May 31, 1955     A. L. APPEL     2,709,543
SOAP DISPENSER
Filed Nov. 3, 1954     2 Sheets-Sheet 2
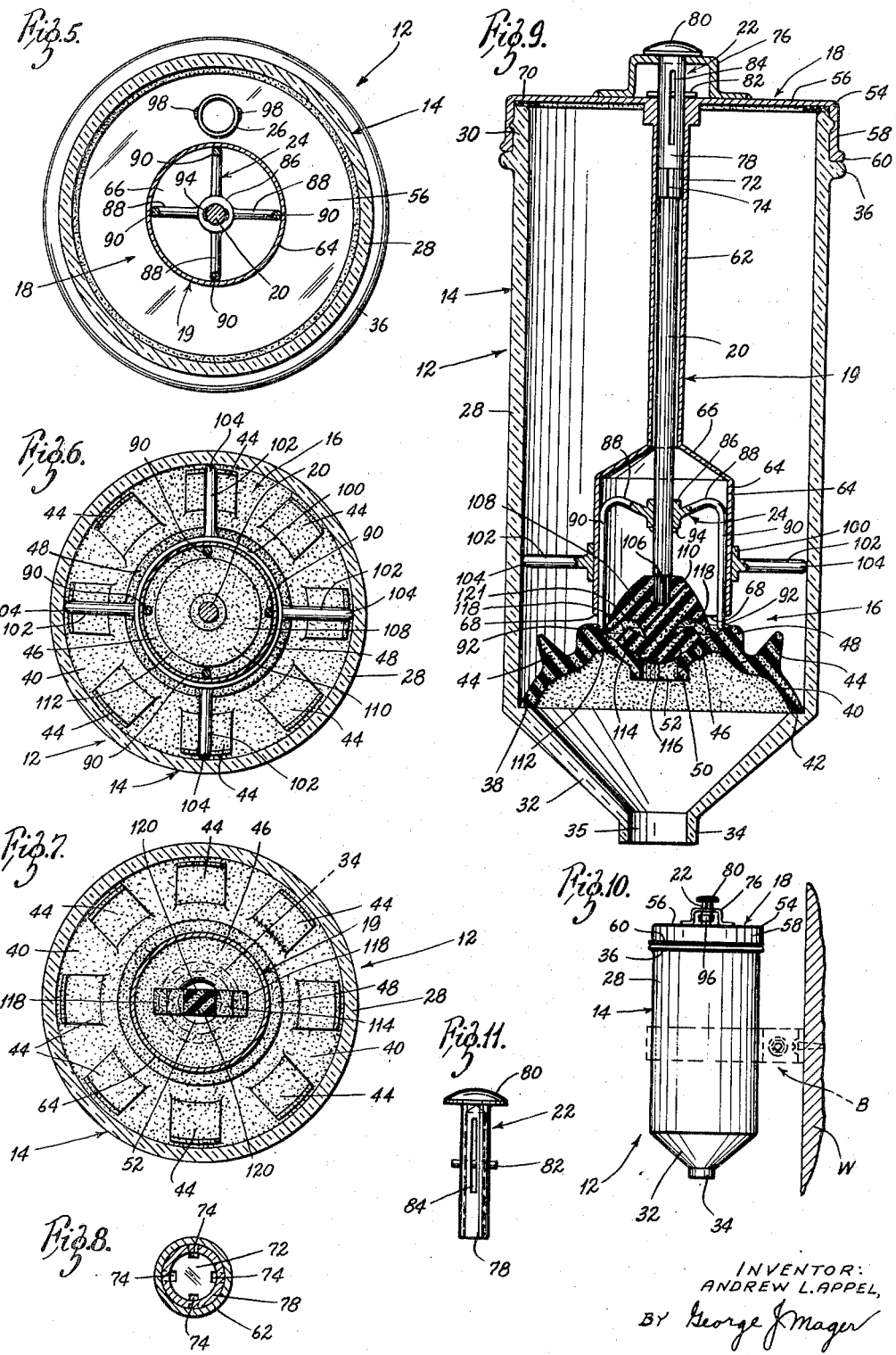
INVENTOR:
ANDREW L. APPEL,
BY George J Mager
HIS ATTORNEY.

United States Patent Office 2,709,543
Patented May 31, 1955

2,709,543

SOAP DISPENSER

Andrew L. Appel, St. Louis, Mo.

Application November 3, 1954, Serial No. 466,551

9 Claims. (Cl. 222—246)

The present invention relates generally to improvements in manually operated dispensers. More particularly, the invention is directed to a novel and improved mechanism for dispensing powdered soap or other granular cleansing material, as well as liquid soap, from a container that is suitably mounted for example, on a factory wash room wall or the like.

There are numerous dispensers of this type in use throughout the land, so that it is not deemed necessary to elaborate on the advantages they provide. In consequence of their construction however, most if not all prior art powdered soap dispensers frequently fail to function properly. That is to say, the powdered contents of the containers are not shielded from the normally excessive moisture existent in the ambient atmosphere, so that caking of the soap usually results, thus impairing the dispensing operations as is understood.

An important object of my invention is to provide a dispenser construction adapted to hermetically seal the powdered soap therein from atmosphere at all times except during the slight intervals requisite to replenish the container.

Another object of my invention is to provide novel means, automatically effective in response to each dispensing operation, for agitating the mass of powdered soap within the container whereby to insure the fluidity thereof for a subsequent dispensing operation.

Economical dispensing of the material is always desirable, and it is a further object of my invention to provide means whereby the quantity or amount of soap to be discharged is determinate, irrespective of whether the soap is in powdered or liquid form. In other words, it is understandable that a dispenser mounted for example in a factory wash room, is required to discharge a greater quantity of cleansing material than a dispenser mounted for example in a public rest room or the like. As will appear hereinafter, slight variations in the length of a manually operable plunger included in the mechanism of the invention are adapted to vary the amount of material that may be dispensed. Thus economical distribution of soap may be had with respect to individual dispensers.

Preferably but not necessarily, the receptacle or container of the instant dispenser is formed of transparent material, so as to visibly indicate the soap level at all times. Means are provided for replenishing the container whenever the soap level descends to a plane visibly indicating such need.

Broadly, the dispenser of the present invention includes: a transparent cylindrical container that is open at both ends, the upper end being provided with external threads, the lower end being of tapered or conical configuration and merging into a depending cylindrical flange portion that defines the ultimate material discharge segment of a hollow rubber ball segment disposed in the lower end portion of the container, said ball segment having a circular bead portion adapted, in cooperation with the lower peripheral edge of a cylindrical shell, to meter and segregate a selected quantity of material from the mass of material in the container; a cover member for the upper end of the container, said cylindrical shell depending from the cover member centrally of said container; plunger operable means for actuating said rubber ball segment to meter the selected quantity of material; means automatically effective in response to release of the plunger operable means for dispensing the metered and segregated quantity of material by gravity; and means for replenishing the container when the material therein is visually shown to be at a low level.

A more comprehensive understanding of the invention and its operation may be had from the detailed description thereof to follow with reference to two sheets of drawings that illustrate the preferred construction.

In these drawings:

Figure 1 is a top plan view of a soap dispenser incorporating the principles of my invention;

Figure 2 is a vertical sectional view of said dispenser taken on the line 2—2 of Figure 1;

Figure 3 is a vertical sectional view of the dispenser taken on the line 3—3 of Figure 1;

Figures 4 and 5 are horizontal sectional views taken respectively on the lines 4—4 and 5—5 of Figure 2;

Figures 6 and 7 are also horizontal sectional views, these being taken respectively on the lines 6—6 and 7—7 of Figure 2;

Figure 8 is a horizontal sectional view on an enlarged scale, taken on the line 8—8 of Figure 3;

Figure 9 is a view similar to Figure 2, the movable elements of the dispenser being illustrated in the positions they may occupy just prior to the completion of a dispensing operation;

Figure 10 is a reduced scale side elevational view of the dispenser mounted in operative position on a wall by means of a suitable bracket, said bracket being suggested in broken lines; and Figure 11 is an elevational view of a hollow operating plunger included in the dispenser structure, this view exhibiting a plunger adapted to provide for the dispensing of a greater quantity of soap than the plunger appearing in Figures 2, 3, and 9.

With particular reference now to Figure 10, the dispenser embodying my invention is designated in its entirety by the numeral 12. The dispenser 12 would be mounted above a washbowl on a wall W, that could for example be a factory wash room wall, by means of a suitable supporting bracket B, as suggested in broken lines. It is noted that the invention may be mounted otherwise if desired, but it is requisite that it be vertically dispositioned for most efficient operation.

The details of construction are more clearly presented in Figures 1 through 8, where it is seen that the dispenser 12 includes: a cylindrical receptacle or container generally designated 14; a metering assembly generally designated 16; a removable cover assembly 18 that rigidly supports a depending tubular shell generally designated 19, and including a lower end portion which is included in said metering assembly; a control rod 20 reciprocable in said shell; a manually operable hollow plunger generally designated 22 for effecting downward movements of the control rod; a guide member 24 for said control rod; a filler pipe 26; and other elements included in the assemblies, or associated with the components enumerated above, as will appear.

The container 14 comprises a cylindrical body portion 28 having an externally threaded upper or neck end 30, and a conical or tapered lower end 32 that terminates in a cylindrical depending flange segment 34 to define an orifice or discharge opening 35. Preferably, a circular bead 36 is provided on the container 14, said bead defining the upper extent of the body portion 28, and the lower extent of the externally threaded neck end 30 of said container. As demonstrated in Figures 2 and 3, the tapered lower end 32 thereof is so fashioned as to provide an annular horizontal shoulder or ledge 38 interiorly of the container.

The metering assembly 16 includes a segment 40 of a hollow rubber ball, the chordal base or marginal edge 42 of said segment being disposed against the ledge 38 as shown. A series of circularly spaced upwardly projecting finger members 44 is provided on the arcuate ball segment 40 for a reason to appear. As shown in the drawings, these fingers are integrally formed with said ball segment, but it is to be understood that they may be independently molded and bonded to said segment if desired. It is noted that in the illustrated embodiment of the invention, eight fingers 44 are provided as an inspection of Figures 6 and 7 will demonstrate. In the interest of illustrative clarity however, finger members 44 that should appear in the background have been omitted in Figures 2, 3, and 9.

Centrally thereof, the hollow rubber ball segment 40 has formed therein a downwardly converging annular wall 46 that is surmounted by an integral circular bead portion 48, and terminates in a depending circular flange portion 50 that defines an opening designated by the numeral 52.

The assembly 18 includes a cover member 54 having a top wall 56, and an internally threaded circular side wall 58 that terminates in an annular bead portion 60. Said assembly further includes the previously mentioned depending tubular shell 19 that is seen to include a small diametered cylindrical section 62, and a relatively large diametered cylindrical section 64, these sections being integrated by a conical section 66 as illustrated. Numeral 68 designates the lower peripheral edge of the cylindrical section 64. Numeral 70 designates a compressible gasket interposed between the brim of the container neck 30, and the top wall 56 of the cover member 54.

The diameter of the control rod 20 is smaller than the internal diameter of the cylindrical section 62. However at its upper end, said control rod terminates in an enlarged cylindrical head 72 that has a sliding fit in said section. With particular reference to Figure 8, the head 72 has formed in its periphery one or more vertical grooves 74 for a reason to appear.

The upper end portion of the hollow plunger 22 is reciprocably supported in a suitable bracket 76 that is rigid with the top wall of the cover member 54. The lower end portion 78 of said plunger is similarly supported in the cylindrical section 62, and engages against the top surface of the rod head 72. Reverting to Figure 8, it is seen that the vertical grooves 74 are of sufficient depth to establish communication between the hollow plunger 22 and the space surrounding the rod 20 in the cylindrical section 62. A finger-piece in the form of a button 80 surmounts the plunger 22, a transverse pin 82 extends therethrough, and an elongated vertical slot 84 is formed therein, as clearly shown.

The guide member 24 for the lower end of the control rod is of a spider-like configuration, and is slidably disposed in the cylindrical section 64. It includes an apertured central body portion 86 having a plurality of circularly spaced radial legs 88, four legs being preferable as shown particularly in Figure 5. Each of the legs 88 merges into a depending guide rod 90 that terminates in a rounded tip portion 92 as illustrated. The guide member is rigidly secured to the rod 20 by welding as suggested at 94, or otherwise.

The filler pipe 26 extends through an opening in the top wall 56 of the cover member, and projects thereabove to receive a removable closure member 96. Said pipe is maintained in position by means of welding as suggested at 98, or otherwise.

Means are provided to stabilize the tubular shell 19 depending from the cover member 54. To this end a circular band 100 is press-fitted onto the cylindrical section 64 above the lower peripheral edge 68 thereof. Projecting laterally from the band 100, is a series of circularly spaced radial pins 102 each terminating in a rounded tip portion 104 adapted to lightly engage the inner periphery of the container 14.

The control rod 20 terminates at its lower end in a reduced extension 106 that is knurled or splined, and bonded thereto is the main body portion 108 of a substantially bell-shaped element 110 of resilient material such as rubber. The main body portion 108 of the bell element is provided with a feather-edged rim 112, and has integrally formed therewith a depending cross bar 114 of the configuration clearly shown in Figures 2 and 3. As shown in these views, the length of said cross bar is less than the diameter of the rim 112, and it includes a flat bottom surface 116, upwardly converging end surfaces 118, and side surfaces 120 that extend upwardly, and so to speak merge arcuately into the main body 108 of the bell element, thus providing an annular depression 121 therein for reasons to appear.

The hollow operating plunger shown in Figure 11 is similar in every respect with the plunger 22 already described, except that it is of greater length. Therefore the parts are identified as before, it being noted that the increase in length lies between the finger-piece 80 and the transverse pin 82.

Although the manner of assembling the dispenser is believed to be manifest, a brief explanation will be given with respect to some of the elements. The ball segment 40, after having been inserted in position against the ledge 38, may be said to integrate itself therewith and with the container body 28. The overall length of the shell depending from the cover member 54 is such that when the cover is screwed onto the container neck 30 until the bead 60 engages against the bead 36, the lower peripheral edge 68 of said shell cylindrical section 64 will firmly engage against the inner circumference of the rubber ball segment bead portion 48.

In applying the cover 54, the gasket 70 will have been compressed, and the previously positioned control rod and the elements associated therewith will have been enclosed, as should be apparent. It should also be evident that this operation is facilitated by the provision of the radial pins 102, and the rounded ends 104 thereon. With the parts thus assembled, the cross bar 114 lies diametrically across the opening 52, and in contact with the downwardly converging annular wall 46 of the ball segment, as shown particularly in Figure 2. As will be more explicitly explained hereinafter, the quantity of material that may be metered and dispensed in one operation is dependent on the length of that portion of the operating plunger 22 that projects above the bracket 76. The pin 82 prevents fortuitous displacement of the plunger. This pin is pressfitted into diametrically opposed openings provided therefor in the plunger, with the latter rotated axially 180° from the position thereof shown in the drawings.

From the foregoing, it should be apparent that after the container has been filled via the pipe 26 followed by the application of the closure 96, the soap contents are hermetically sealed from atmosphere.

As hereinbefore noted, the invention may be employed to dispense soap in either liquid or powdered form. In the explanation of the operation to follow immediately, powdered soap has been selected as the material to be metered and dispensed.

Operation

Assuming that the container 14 has been supplied with powdered soap via the pipe 26, and assuming further that the operating plunger 22 illustrated in Figures 2, 3, and 9, has a reciprocal stroke calculated to meter and dispense approximately one half teaspoonful of the material, it is only necessary to apply downward manual pressure to said plunger until the button 80 strikes against the bracket 76, followed by the withdrawal of such pressure, In consequence of this simple procedure, the plunger 22 and the elements associated therewith first move downwardly from the disposition thereof portrayed in Figures 2 and 3, to the disposition thereof portrayed in Figure 9, whereupon they automatically return to said Figures 2 and 3 disposition. Thus during the initial concurrent downward movement of said operating plunger and the control rod 20, the cross bar 114 of the bell member 110 is flexed into the generally arcuate configuration exhibited in Figure 9, and is simultaneously brought into intimate contact with the converging wall 46 of the hollow rubber ball segment 40. Simultaneously also, the feather-edged rim 112 of the bell member is brought into engagement with said converging wall 46, whereby a positive seal is produced that segregates the space below the ball segment from that thereabove. It is observed that the annular depression 121 serves to accommodate the described deformation of the bell member cross bar 114.

Now as the plunger 22 and control rod 20 continue to descend, the central portion of the ball segment 40 is depressed, thus forcing the bead segment 48 downwardly away from the lower peripheral edge 68 of the stationary cylindrical section 64. Consequently, an annular cavity or clearance space is automatically produced between said peripheral edge and the depressed area of the ball segment, and into this cavity will flow from the surrounding mass of material in the container, a quantity thereof approximately equal to a half teaspoonful. Gravitation of the material toward said cavity is augmented by the inward movement of the fingers 44 from their Figure 2 to their Figure 9 position, this action of said fingers also serving to agitate the mass of material each time a dispensing operation is being performed.

Obviously, as the control rod 20 is depressed, the guide member 24 that is rigid therewith also descends, so that during the final downward travel of said rod, the guide member also applies pressure at four circularly spaced points to the central portion of the ball segment.

When at the end of the downward stroke the plunger 22 is released, the combined resiliencies of the ball segment 40 and the bell member 110 instantly and automatically effect the return of all the dispenser elements to their Figure 2 status. This action is facilitated by the air escape provisions that include the space surrounding the rod 20 in the section 62 of the shell, the vertical grooves 74 leading into the hollow plunger, and the elongated slot 84 leading to atmosphere.

That is to say, first of all in consequence of the behavior of the rubber ball segment, the beaded portion 48 thereof will revert to its normal disposition against the lower peripheral edge 68 of the cylindrical section 64, thus trapping within said section and segregating from the mass of material in the container, the half teaspoonful of material that had flown into the cavity aforesaid. As the bead 48 contacts said peripheral edge 68, the bell member 110 will simultaneously revert to its non-deformed configuration portrayed in Figure 2, thus withdrawing the feather-edged rim 112 from contact with the converging wall 46. As a result, the segregated quantity of material drops by gravity from the dispenser 12 via the opening 52 of the rubber ball segment, and the final discharge opening 35 defined by the depending flange segment 34 of the container 14.

It is believed that from the foregoing description and explanation augmented by an inspection of the drawings, it should be manifest that my invention provides an improved dispenser that includes novel means for the efficient attainment of its objectives. It is also believed to be obvious, that smaller or larger quantities of material than a half teaspoonful may be metered and dispensed by the simple expedient of providing a plunger 22 of a lesser or a greater length than the plunger illustrated particularly in Figures 2, 3, and 9.

As hereinbefore noted, the invention contemplates a circular series of eight fingers 44. However, the number of them may optionally be decreased or increased. It is also noted at this point, that when the device of the invention is designed exclusively for liquid soap, the fingers 44 may be dispensed with. Obviously other structural details of the dispenser may also be modified somewhat without departing from the principles of the invention. Wherefore, it is to be understood that I do not desire to be limited to the precise details of construction illustrated and described, the scope of the invention being defined in the claims hereunto appended.

What I claim is:

1. A dispenser of the type described including: a transparent container open at both ends and terminating at its lower end in a cylindrical flange segment defining an ultimate material discharge opening; a cover member for closing the upper open end of the container, said cover member supporting a pipe for filling and replenishing the container; removable closure means for the pipe; a tubular shell depending from the cover member centrally within the container; means for stabilizing the lower end portion of the shell; a segment of a hollow rubber ball disposed in the lower portion of the container and adapted in cooperation with the lower peripheral edge of said shell to normally seal the interior of the shell against the flow thereinto of material from the surrounding mass of material in the container; manually depressible means for deforming the rubber ball segment whereby to admit the flow of a predetermined quantity of said material into a cavity produced in said ball segment subjacent to the lower peripheral edge aforesaid of the shell; and means automatically effective following release of said depressible means to first trap the material in said cavity within the shell, and then to discharge the same by gravity via the ultimate discharge opening aforesaid.

2. A dispenser of the type described including: a transparent container open at both ends and having a tapered lower end portion that terminates in a depending cylindrical flange defining an ultimate material discharge opening; a cover member for closing the upper open end of the container, said cover member supporting a pipe for filling and replenishing the container; removable closure means for the pipe; a tubular shell depending from the cover member centrally within the container and including integrally, a small diametered cylindrical section, a large diametered cylindrical section, and a conical section integrating the two sections aforesaid; means for stabilizing the lower end portion of the shell, said means comprising a band press-fitted onto said large diametered section, and having a series of circularly spaced radial pins, each terminating in a rounded tip portion adapted to lightly engage the inner periphery of said container, projecting laterally therefrom; a segment of a hollow rubber ball disposed in the lower portion of the container and adapted in cooperation with the lower peripheral edge of said shell to normally seal the interior of the shell against the flow thereinto of material from the surrounding mass of material in the container; manually depressible means for deforming the rubber ball segment whereby to admit the flow of a predetermined quantity of said material into a cavity produced in said ball segment subjacent to the lower peripheral edge aforesaid of the shell; and means automatically effective following release of said depressible means to first trap the material in said cavity within the shell, and then to discharge the same by gravity via the ultimate discharge opening aforesaid.

3. A dispenser of the type described including: a transparent container open at both ends and having a tapered lower end portion that terminates in a depending cylindrical flange defining an ultimate material discharge opening; a cover member for closing the upper open end of the container, said cover member supporting a pipe for filling and replenishing the container; removable closure means for the pipe; a tubular shell depending from the cover member centrally within the container and including integrally, a small diametered cylindrical section, a large diametered cylindrical section, and a conical section integrating the two sections aforesaid; means for stabilizing the lower end portion of the shell, said means comprising a band press-fitted onto said large diametered section, and having a series of circularly spaced radial pins, each terminating in a rounded tip portion adapted to lightly engage the inner periphery of said container, projecting laterally therefrom; a segment of a hollow rubber ball disposed in the lower portion of the container and adapted in cooperation with the lower peripheral edge of said shell to normally seal the interior of the shell against the flow thereinto of material from the surrounding mass of material in the container; manually depressible means for deforming the rubber ball segment whereby to admit the flow of a predetermined quantity of said material into a cavity produced in said ball segment subjacent to the lower peripheral edge aforesaid of the shell; and means automatically effective following release of said depressible means to first trap the material in said cavity within the shell, and then to discharge the same by gravity via the ultimate discharge opening aforesaid; said hollow rubber ball segment being provided with a series of circularly spaced upwardly projecting fingers adapted, when said ball segment is deformed, to move inwardly whereby to agitate the mass of material in the container about said segment.

4. A dispenser for liquid or powdered soap including: a cylindrical container having a tapered bottom portion terminating in a depending segment defining a discharge opening; a cover member for the upper end of the container; a cylindrical shell depending from the cover member centrally of the container; a hollow rubber ball segment supported on an internal annular ledge provided therefor in said container at the upper end of the tapered portion thereof; a circular bead portion integrally formed on the upper surface of the ball segment normally in engagement with the lower peripheral edge of the shell; a control rod reciprocable in the shell and having a bell-shaped element of resilient material affixed to the lower end thereof to deform said ball segment when the control rod is depressed; and a slidably mounted vertically disposed hollow plunger for manually depressing the control rod.

5. A dispenser for liquid or powdered soap including: a cylindrical container having a tapered bottom portion terminating in a depending segment defining a discharge opening; a cover member for the upper end of the container; a cylindrical shell depending from the cover member centrally of the container; a hollow rubber ball segment supported on an internal annular ledge provided therefor in said container at the upper end of the tapered portion thereof; a circular bead portion integrally formed on the upper surface of the ball segment normally in engagement with the lower peripheral edge of the shell; a control rod reciprocable in the shell and having a bell-shaped element of resilient material affixed to the lower end thereof to deform said ball segment when the control rod is depressed; a slidably mounted vertically disposed hollow plunger for manually depressing the control rod; guide means for the control rod rigid therewith and vertically slidable in the lowermost section of said shell; and means limiting the vertical movements of said plunger.

6. A dispenser for liquid or powdered soap including the structure set forth in claim 5, and means for replenishing the container, said means comprising a filler pipe rigid with the top wall of the cover member and extending thereabove to receive a removable closure.

7. A dispenser for liquid or powdered soap including the structure set forth in claim 5, and means connecting the interior of the shell with atmosphere, said means comprising: an enlarged head provided on the upper end of said control rod, said head being slidable in the uppermost section of the cylindrical shell; at least one vertical groove formed in the periphery of said head, said groove being of sufficient depth to establish communication between the hollow plunger and the space in said shell surrounding the control rod; and an elongated vertical slot leading to atmosphere formed in said plunger.

8. In a dispenser of the character and for the purpose described: a container having an internal annular horizontal ledge formed in the lower end portion thereof; a segment of a hollow rubber ball having its chordal marginal edge in intimate contact with said ledge and the surrounding inner periphery of the container, said ball segment being provided with a series of circularly spaced upwardly projecting fingers, a central downwardly converging annular wall surmounted by a circular bead portion, and a flange depending from said wall to define a central opening therein; and plunger operated means adapted to depress the central portion of said ball segment and to simultaneously seal said opening and effect the inward movement of said fingers.

9. In a dispenser of the character and for the purpose described: a container having an internal annular horizontal ledge formed in the lower end portion thereof; a segment of a hollow rubber ball having its chordal marginal edge in intimate contact with said ledge and the surrounding inner periphery of the container, said ball segment being provided with a series of circularly spaced upwardly projecting fingers, a central downwardly converging annular wall surmounted by a circular bead portion, and a flange depending from said wall to define a central opening therein; plunger operated means adapted to depress the central portion of said ball segment and to simultaneously seal said opening and effect the inward movement of said fingers, said means comprising: a vertically reciprocable control rod terminating at its upper end in an enlarged cylindrical head having vertical grooves formed in its periphery, and terminating at its lower end in a reduced knurled or splined depending extension; and a substantially bell-shaped element of resilient material, said element having a main body portion bonded to the depending extension of the control rod, a feather-edged rim portion, a cross bar portion depending from the main body portion the length of the cross bar portion being less than the diameter of said rim portion, and an annular depression formed in said main body to accommodate the extremities of the cross bar when the bell-shaped member is deformed in consequence of depressing the central portion of the rubber ball segment aforesaid.

References Cited in the file of this patent
UNITED STATES PATENTS

| | | |
|---|---|---|
| 1,337,789 | Nicholas | Apr. 20, 1920 |
| 1,449,571 | Younger | Mar. 27, 1923 |